Dec. 28, 1948.  E. A. ROCKWELL  2,457,732
HYDRAULIC LATCH CONTROL MECHANISM
Original Filed June 29, 1943  2 Sheets-Sheet 1

INVENTOR
Edward A. Rockwell
BY
Arthur Wright
ATTORNEY

Dec. 28, 1948.  E. A. ROCKWELL  2,457,732
HYDRAULIC LATCH CONTROL MECHANISM
Original Filed June 29, 1943  2 Sheets-Sheet 2
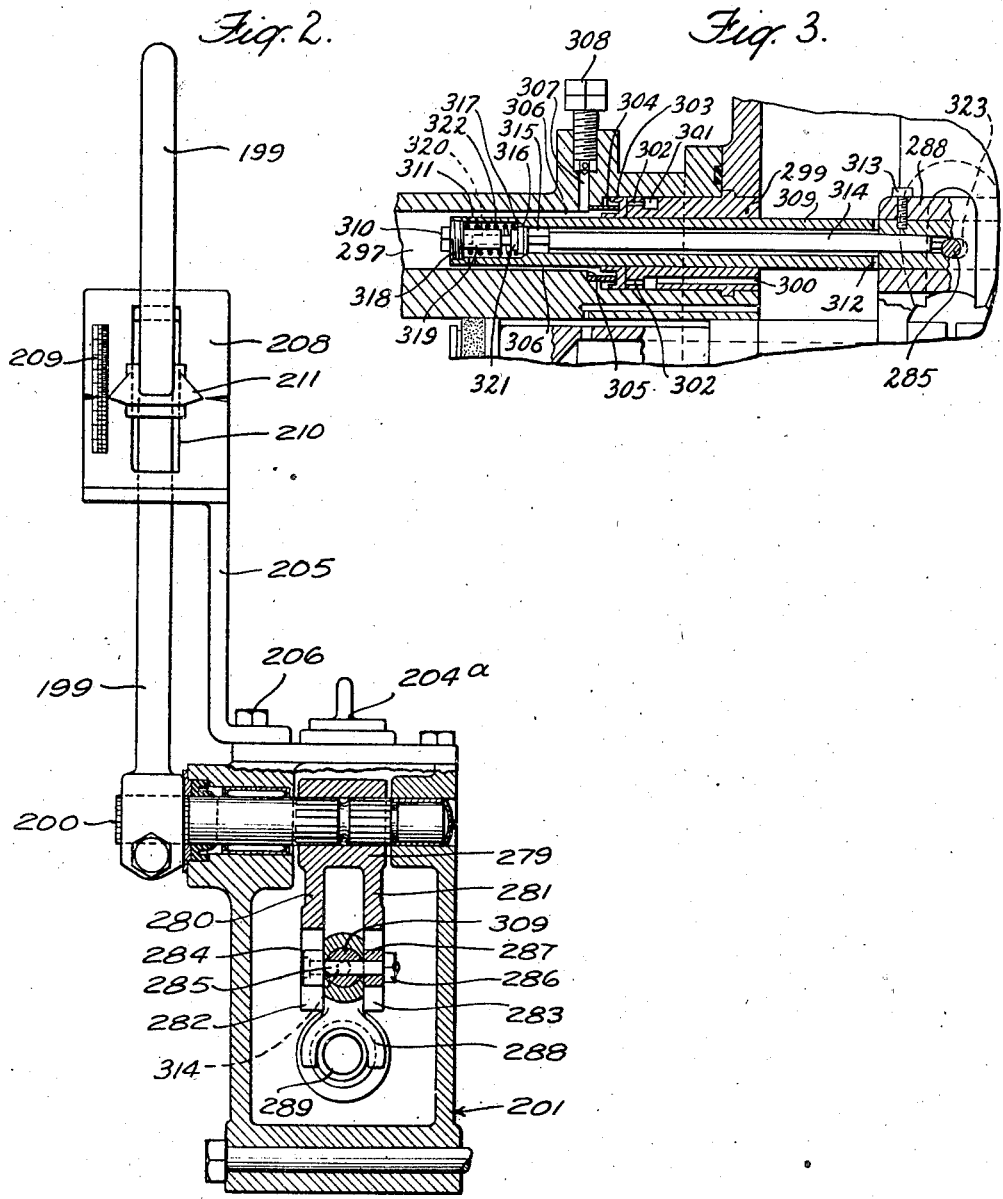
INVENTOR
Edward A. Rockwell
BY
Arthur Wright
ATTORNEY Patented Dec. 28, 1948

2,457,732

UNITED STATES PATENT OFFICE 2,457,732

HYDRAULIC LATCH CONTROL MECHANISM

Edward A. Rockwell, Cleveland, Ohio

Original application June 29, 1943, Serial No. 492,745. Divided and this application October 28, 1944, Serial No. 560,869

14 Claims. (Cl. 192—8)

My invention relates to a mechanism for controlling any device which is operated hydraulically and which, for example, may contain a master cylinder having a hydraulic latch for the same.

The present application is a division of my application upon Self-contained hydraulic servo mechanism, Ser. No. 492,745, filed June 29, 1943.

The object of my invention is to provide a hydraulic mechanism of the above character which may be used for any desired purpose but which, for example, is applicable especially for the control of automotive vehicles, airplanes, steam engines, steering gears or locomotive reverse gears. For this purpose, furthermore, I may utilize, also, a self-latching construction which has fast and accurate metering characteristics. Also, the master cylinders used are provided with suitable liquid compensation in order to maintain the phase relation between the control means and the output means.

Further objects of my invention will appear from the detailed description of the same hereinafter.

While my invention is capable of being carried out in many different ways for the purpose of illustration I have shown only one embodiment of my invention in the accompanying drawings, in which Fig. 1 is a longitudinal section showing the use of a hydraulic latch in an embodiment of my invention;

Fig. 2 is a transverse section of the form shown in Fig. 1; and

Fig. 3 is an enlarged section showing the lower middle and left-hand portion of the apparatus of Fig. 1.

Figure 1:
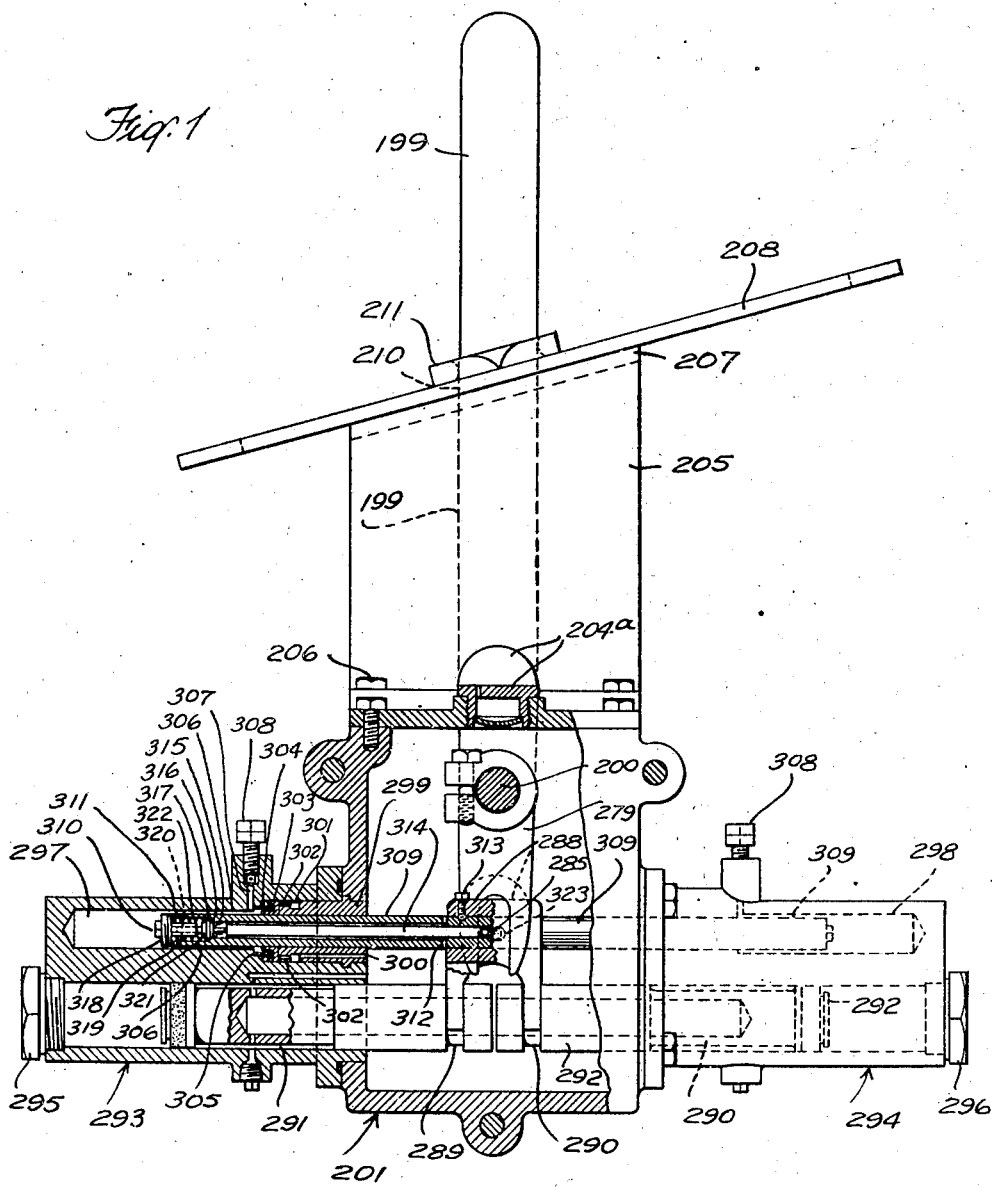

In the embodiment of my invention shown in the drawings, I have illustrated a form of hydraulic latch or locking mechanism for maintaining a hand controlling lever 199, which may, for example, be located in a railway locomotive cab, and which is applicable for moving a locomotive reverse gear (not shown) to any desired adjusted position. In this instance, a shaft 200, for operating the locomotive in reverse gear, is provided within a casing 201 with a bifurcated crank 279, two arms 280 and 281 of which are provided with slots 282 and 283 to receive sliding square blocks 284 and 287 on a bolt 285 having a nut 286 thereon. The blocks 284 and 287 slide in the recesses 282 and 283, respectively, and between the two arms 280 and 281 there is a yoke member 288, through which the bolt or cross pin 285 passes, which extends into slots 289 and 290 on master cylinder pistons 291 and 292. In this instance the pistons 291 and 292 are located in cylinder blocks 293 and 294 having screw caps 295 and 296. The cylinder blocks 293 and 294 also contain within the same hydraulic latch cylinders 297 and 298, both of which are constructed alike and only one of which, therefore, will be described in detail. Each of these cylinders contains within the same a bushing 299 provided with an inlet passageway 300 connecting with a chamber 301, adjacent to longitudinal ports 302 communicating with a U-shaped lip seal inlet valve sealing ring 303 held in place by a retaining ring 304 which abuts against a shoulder 305 in the cylinder 297, which in turn leads into an annular chamber 306 forming a part of the hydraulic latch chamber 297, leading to an air bleeder port 307 normally closed by an air bleeder screw 308 of the usual construction. Within the bushing 299 there is a sleeve plunger 309 provided at one end with a screw cap 310. Adjacent to the screw cap 310 there are radial ports 311 in the sleeve plunger 309. Also, said sleeve plunger has radial ports 312 within the cylinder casing 201 and it will be noted that the said sleeve plunger 309 extends, likewise, into the cylinder 298, the portion within the cylinder 298 being constructed the same as the portion thereof within the cylinder 297. A screw 313 passes through the yoke 288 into the sleeve plunger 309 to hold it in fixed relation in regard thereto. Also, within each of the sleeve plungers 309 there is a valve operating rod 314 which contacts with the cross pin 285 and at its other end has flutings 315 adjacent to a conical outlet valve seat 316 on the inside of the sleeve plunger 309. A valve head 317 is adapted to seat on the conical valve seat 316, the valve head being located in a valve chamber 318 adjacent to the screw cap 310, which has a hollow stem 319 to receive a valve stem 320 which is integral with the valve head 317. A shoulder 321 on the valve stem 320 is provided for supporting a coil spring 322 located around the hollow stem 319 so that the left end of said spring 322 seats against the cap screw 310. As shown in Fig. 1, the yoke 288 and the sleeve plunger 309 have a lateral elongated hole 323 through which the bolt 285 passes, so as to provide a slight lost motion between the movement of the valve operating rod 314 with regard to the bifurcated crank 279 and the sleeve plunger 309 so that when the bifurcated crank 279 is moved to the left or right, in Fig. 1, it will first move the valve operating rod 314 to unseat the particular valve 317 before the sleeve plunger 309 is moved in the corresponding direction in said figure. Without such previous movement of the valve rod 314 being possible, the movement of the master cylinder plunger 291 towards the left or right in said figure would not unseat the particular valve 317, so that the liquid in the latch cylinder 297 would be trapped therein to prevent the movement of the sleeve plunger 309 as well as the master cylinder piston 291 to which it is attached until the hand lever 199 has been moved previously. In this way, the hydraulic latch cylinders 297 and 298 and their pistons will hold the master cylinder pistons 290 and 291 in any adjusted position thus maintaining the adjusted position of the hand lever 199 until said hand lever is again moved for the adjustment of the position of the said locomotive reverse gear, for example. During any withdrawal movement of the sleeve plunger 309 from its particular cylinder the liquid will enter from the casing 201 through the passageway 300, past the seal 303, through chamber 305 and into the annular chamber 306 to the hydraulic latch cylinder 297.

In the operation of the embodiment of my invention as shown in the drawings I have provided means for maintaining the adjusted position of the manual operating lever 199 with the aid of the hydraulic latching or locking device which is comprised of the two latching cylinders 297 and 298, having therein the sleeve plunger 309 and the two valve members comprising conical valve seat 316 and valve head 317 at each of the two terminal portions of the said plunger 309 and the two valve operating rods 314 on either side of the manually operable bolt 285. The sleeve plunger 309 moves with the yoke 288 and with the master cylinder plunger 290 and 291 so that the pressure of the liquid exerted on the said master cylinder pistons cannot result, of itself, in displacing the said master cylinder pistons, nor in displacing the adjusted position of the radius rod 278 until the hand lever 199 is moved first manually. Owing to the elongated hole 323 the hand lever 199 first moves one or the other of the valve operating rods 314 to unseat the outlet valve comprising the valve seat 316 and valve head 317 so as to release the liquid past said valve through ports 312 to the casing 201. When the liquid in the other one of the cylinders 297, 298 is being drawn into its particular cylinder, this is accomplished by the entry of the liquid through the particular passageway 300 past the rubber seal inlet valve 303 and thence into the hydraulic latch chamber. By this means the locomotive reverse gear, for example, cannot be accidently moved out of adjustment by the forces exerted thereon unless the hand lever 199 is moved first to a new position of adjustment.

While I have described my invention above in detail I wish it to be understood that many changes may be made therein without departing from the spirit of the same.

I claim:

1. A hydraulic latch comprising a cylinder having an inlet valve therein, a plunger longitudinally reciprocable therein, an inlet valve located around the outside of the plunger and seating on the cylinder, an outlet valve mounted on the plunger, a valve-unseating rod associated with the plunger and means for operating the plunger and valve-unseating rod independently of each other.

2. A hydraulic latch comprising a cylinder having an inlet valve therein, a plunger longitudinally reciprocable therein, an inlet valve located around the outside of the plunger and seating on the cylinder, an outlet valve mounted on the plunger, a valve-unseating rod located within the plunger and means for operating the plunger and valve-unseating rod independently of each other comprising a lever having a positive connection to the valve-unseating rod and a lost motion connection to the plunger.

3. A hydraulic latching cylinder, a longitudinally reciprocable piston arranged to be locked in position therein, means for moving the piston, and a hydraulic latching means adapted to maintain the piston in a position into which it has been moved, comprising an inlet passageway for pressure liquid leading to said cylinder, an inlet valve around the outside of the piston to control the inlet passageway, an outlet passageway leading from said cylinder, and valve means controlling said passageways.

4. A hydraulic latching cylinder, a longitudinally reciprocable piston arranged to be locked in position therein, means for moving the piston, and a hydraulic latching means adapted to maintain the piston in a position into which it has been moved until released by the moving means, comprising an inlet passageway for pressure liquid leading to said cylinder, an inlet valve around the outside of the piston to control the inlet passageway, an outlet passageway leading from said cylinder, and valve means controlling said passageways.

5. In combination, a movable element comprising a piston in a cylinder and means to maintain the adjusted position of said element including a hydraulic latch comprising a second cylinder having an inlet valve therein, a plunger longitudinally reciprocable therein having a lever connection to said piston, an outlet valve mounted on the plunger, a valve-unseating rod associated with the plunger and manual means for moving said element and operating the plunger and valve-unseating rod independently of each other.

6. In combination, a movable element comprising a piston in a cylinder and means to maintain the adjusted position of said element including a hydraulic latch comprising a second cylinder having an inlet valve therein, a plunger longitudinally reciprocable therein having a lever connecton to said piston, an outlet valve mounted on the plunger, a valve-unseating rod located within the plunger and manual means for moving said element and operating the plunger and valve-unseating rod independently of each other comprising a manually operable lever having a positive connection to the valve-unseating rod and a lost motion connection to the plunger by the first mentioned lever.

7. In combination, a piston in a cylinder, a hydraulic latching cylinder, a longitudinally reciprocable plunger arranged to be locked in position therein, manual means, having a lost-motion connection to the plunger and a yoke, for moving the piston, and a hydraulic latching means connected to said manual means, adapted to maintain the piston in a position into which it has been moved, comprising an inlet passageway for pressure liquid leading to said cylinder, an outlet passageway leading from said cylinder through said piston and valve means controlling said passageways.

8. In combination, a piston in a cylinder, a hydraulic latching cylinder, a longitudinally reciprocable plunger arranged to be locked in position therein, manual means, having a lost-motion connection to the plunger and a yoke, for moving the piston, and a hydraulic latching means connected to said manual means, adapted to maintain the piston in a position into which it has been moved until released by the moving means, comprising an inlet passageway for pressure liquid leading to said cylinder, an outlet passageway leading from said cylinder through said piston, and valve means controlling said passageways.

9. A hydraulic latch comprising a cylinder, a plunger longitudinally reciprocable therein having a lip-seal inlet valve, having an elastic lip between the plunger and cylinder, a valve movable relatively to the plunger, an outlet valve-unseating rod associated with the plunger and means for operating the plunger and valve-unseating rod independently of each other.

10. A hydraulic latch comprising a cylinder, a plunger longitudinally reciprocable therein having a lip-seal inlet valve, having an elastic lip between the plunger and cylinder, a valve movable relatively to the plunger, an outlet valve-unseating rod located within the plunger and means for operating the plunger and valve-unseating rod independently of each other comprising a lever having a positive connection to the valve-unseating rod and a lost motion connection to the plunger.

11. In combination, a hydraulic latching cylinder, a longitudinally reciprocable piston arranged to be locked in position therein, manual means for moving the piston, a hydraulic latching means connected to said manual means, adapted to maintain the piston in a position into which it has been moved, comprising an inlet passageway for pressure liquid leading to said cylinder, an outlet passageway leading from said cylinder through said piston and inlet and outlet valve means controlling said passageways, the inlet valve being carried by said piston, a second hydraulic latching cylinder into which the said latching piston also extends to form a second locking piston therein, said second cylinder having an inlet passageway for pressure liquid also an outlet passageway for liquid, an inlet valve being carried by said piston, and a sump between the two cylinders into which said outlet passageways discharge.

12. In combination, a hydraulic latching cylinder, a longitudinally reciprocable piston arranged to be locked in position therein, manual means for moving the piston, a hydraulic latching means connected to said manual means, adapted to maintain the piston in a position into which it has been moved until released by the moving means, comprising an inlet passageway for pressure liquid leading to said cylinder, an outlet passageway leading from said cylinder through said piston and inlet and outlet valve means controlling said passageways, the inlet valve being carried by said piston, a second hydraulic latching cylinder into which the said latching piston also extends to form a second locking piston therein, said second cylinder having an inlet passageway for pressure liquid also an outlet passageway for liquid, an inlet valve being carried by said piston, and a sump between the two cylinders into which said outlet passageways discharge.

13. In combination, a hydraulic latching cylinder, a longitudinally reciprocable piston arranged to be locked in position therein, manual means for moving the piston, a hydraulic latching means connected to said manual means, adapted to maintain the piston in a position into which it has been moved, comprising an inlet passageway for pressure liquid leading to said cylinder, an outlet passageway leading from said cylinder through said piston and inlet and outlet valve means controlling said passageways, the inlet valve being carried by said piston, a second hydraulic latching cylinder into which the said latching piston also extends to form a second locking piston therein, said second cylinder having an inlet passageway for pressure liquid also an outlet passageway for liquid, an inlet valve being carried by said piston, and a sump between the two cylinders into which said outlet passageways discharge and in which the manual means is located.

14. In combination, a hydraulic latching cylinder, a longitudinally reciprocable piston arranged to be locked in position therein, manual means for moving the piston, a hydraulic latching means connected to said manual means, adapted to maintain the piston in a position into which it has been moved until released by the moving means, comprising an inlet passageway for pressure liquid leading to said cylinder, an outlet passageway leading from said cylinder through said piston and inlet and outlet valve means controlling said passageways, the inlet valve being carried by said piston, a second hydraulic latching cylinder into which the said latching piston also extends to form a second locking piston therein, said second cylinder having an inlet passageway for pressure liquid also an outlet passageway for liquid, an inlet valve being carried by said piston, and a sump between the two cylinders into which said outlet passageways discharge and in which the manual means is located.

EDWARD A. ROCKWELL.

REFERENCES CITED

The following references are of record in the file of this patent:

UNITED STATES PATENTS

| Number | Name | Date |
|---|---|---|
| 692,868 | Lemp | Feb. 11, 1902 |
| 752,491 | Warren | Feb. 16, 1904 |
| 966,750 | Hunt | Aug. 9, 1910 |
| 1,062,561 | Williams et al. | May 20, 1913 |
| 2,109,114 | Kerr | Feb. 22, 1938 |
| 2,190,257 | Clench | Feb. 13, 1940 |
| 2,365,247 | Carlton | Dec. 19, 1944 |

FOREIGN PATENTS

| Number | Country | Date |
|---|---|---|
| 710,182 | France | June 1, 1931 |